(12) United States Patent
Mattos, Jr. et al.

(10) Patent No.: US 8,020,359 B2
(45) Date of Patent: Sep. 20, 2011

(54) METHOD OF USING TEMPORARY DECORATION TO MASS CUSTOMIZE REFILLABLE GLASS VESSELS

(75) Inventors: Louis Mattos, Jr., Douglasville, GA (US); Nilton Antonio Moreira Mattos, Roswell, GA (US)

(73) Assignee: The Coca-Cola Company, Atlanta, GA (US)

( * ) Notice: Subject to any disclaimer, the term of this patent is extended or adjusted under 35 U.S.C. 154(b) by 85 days.

(21) Appl. No.: 12/463,604

(22) Filed: May 11, 2009

(65) Prior Publication Data
US 2010/0281833 A1 Nov. 11, 2010

(51) Int. Cl.
B41M 3/00 (2006.01)
B41F 17/08 (2006.01)
B65B 61/26 (2006.01)

(52) U.S. Cl. ........ 53/411; 53/131.3; 101/38.1; 101/114; 101/116; 101/171

(58) Field of Classification Search .................. 53/411, 53/131.3; 101/38.1, 114, 116, 171
See application file for complete search history.

(56) References Cited

U.S. PATENT DOCUMENTS

| | | | |
|---|---|---|---|
| 3,086,458 A * | 4/1963 | Shafer, Jr. | ...... 53/131.3 |
| 3,659,522 A * | 5/1972 | Dubuit | ...... 53/131.3 |
| 3,760,968 A | 9/1973 | Amberg et al. | |
| 3,891,584 A | 6/1975 | Ray-Chaudhuri et al. | |
| 4,055,441 A | 10/1977 | Taylor et al. | |
| 4,103,698 A | 8/1978 | Richardson et al. | |
| 4,135,014 A | 1/1979 | Salensky et al. | |
| 4,143,183 A | 3/1979 | Rupp et al. | |
| 4,190,168 A | 2/1980 | Jacques | |
| 4,325,775 A | 4/1982 | Moeller | |
| 4,567,681 A | 2/1986 | Fumei | |
| 4,574,020 A | 3/1986 | Fosnaught | |
| 4,671,836 A | 6/1987 | Fumei | |
| 4,675,351 A | 6/1987 | Brown | |
| 4,944,832 A | 7/1990 | Abe et al. | |
| 5,094,912 A | 3/1992 | Deibig et al. | |
| 5,322,578 A | 6/1994 | Ogle et al. | |
| 5,324,078 A | 6/1994 | Bane | |
| 5,448,831 A | 9/1995 | Harwood | |
| 5,587,405 A | 12/1996 | Tanaka et al. | |
| 5,639,529 A | 6/1997 | Gozdecki et al. | |
| 5,693,127 A | 12/1997 | Nigam et al. | |
| 5,951,054 A | 9/1999 | Hagen et al. | |

(Continued)

FOREIGN PATENT DOCUMENTS
DE 102005044621 3/2007
(Continued)

*Primary Examiner* — Stephen F Gerrity
(74) *Attorney, Agent, or Firm* — Brock Kolls

(57) ABSTRACT

The present invention relates to a method of using a combination permanent partial decoration and temporary decoration to mass customize refillable glass vessels. The method comprising: decorating a glass vessel with a permanent partial decoration, receiving the glass vessel at a filling facility, washing the glass vessel in caustic solution to remove presence of a temporary decoration, filling the glass vessel with a product contents, printing the temporary decoration on the glass vessel, distributing the glass vessel to a marketplace for use by a consumer, receiving the consumer used glass vessel at the filling facility, and recycling the glass vessel by returning to the step of washing. Other embodiments include not using the permanent partial decoration and printing the temporary decoration on the glass vessel, wherein at least some of the temporary decoration is printed on top of a background region to increase the luminance qualities of the temporary decoration.

11 Claims, 4 Drawing Sheets

U.S. PATENT DOCUMENTS

| | | | |
|---|---|---|---|
| 5,985,074 | A | 11/1999 | Heemann et al. |
| 6,093,455 | A | 7/2000 | Kamen et al. |
| 6,106,633 | A | 8/2000 | Rouillard |
| 6,136,382 | A | 10/2000 | Kamen et al. |
| 6,147,041 | A | 11/2000 | Takahashi et al. |
| 6,205,452 | B1 | 3/2001 | Warmus et al. |
| 6,221,933 | B1 | 4/2001 | Zhu et al. |
| 6,238,509 | B1 | 5/2001 | Herlfterkamp et al. |
| 6,302,994 | B1 | 10/2001 | Kamiya et al. |
| 6,401,785 | B1 | 6/2002 | Van Geijlswijk |
| 6,493,677 | B1 | 12/2002 | von Rosen et al. |
| 6,577,922 | B2 | 6/2003 | Gadrix et al. |
| 6,590,019 | B2 | 7/2003 | Dheret et al. |
| 6,680,097 | B1 | 1/2004 | Amberger et al. |
| 6,803,085 | B2 | 10/2004 | Blom et al. |
| 6,834,473 | B2 | 12/2004 | Wiedemann |
| 6,964,805 | B1 | 11/2005 | Kuriyama et al. |
| 7,064,857 | B2 | 6/2006 | Parker et al. |
| 7,148,268 | B2 | 12/2006 | Zhu et al. |
| 7,166,341 | B2 | 1/2007 | Heemann et al. |
| 7,263,790 | B2 | 9/2007 | Richards |
| 7,269,930 | B2 | 9/2007 | Kahlisch et al. |
| 7,294,380 | B2 | 11/2007 | Squier et al. |
| 7,383,208 | B2 | 6/2008 | Leo |
| 2002/0035507 | A1 | 3/2002 | Singh et al. |
| 2002/0161464 | A1 | 10/2002 | Weiner |
| 2002/0183220 | A1 | 12/2002 | Falsina et al. |
| 2003/0047277 | A1 | 3/2003 | Bell et al. |
| 2004/0125405 | A1 | 7/2004 | Salomon et al. |
| 2004/0128272 | A1 | 7/2004 | Salomon et al. |
| 2004/0188005 | A1 | 9/2004 | Pearson |
| 2005/0097459 | A1 | 5/2005 | Self |
| 2005/0186371 | A1 | 8/2005 | Kimura et al. |
| 2006/0263558 | A1 | 11/2006 | Crum et al. |
| 2007/0106565 | A1 | 5/2007 | Coelho et al. |
| 2007/0202267 | A1 | 8/2007 | Martin |
| 2007/0240828 | A1 | 10/2007 | Ito et al. |
| 2008/0121537 | A1 | 5/2008 | Sankaran et al. |
| 2008/0129035 | A1 | 6/2008 | McDonald |
| 2008/0134633 | A1 | 6/2008 | Zwilling |
| 2008/0210586 | A1 | 9/2008 | Didio |
| 2009/0104387 | A1* | 4/2009 | Postupack et al. ........... 428/34.6 |
| 2009/0105860 | A1 | 4/2009 | Wiesel |

FOREIGN PATENT DOCUMENTS

| | | |
|---|---|---|
| EP | 0588533 | 3/1994 |
| EP | 1281446 | 2/2003 |
| EP | 1524041 | 4/2005 |
| EP | 1967458 | 9/2008 |
| JP | 7219439 | 8/1995 |
| MX | 2007012387 | 3/2008 |
| WO | 9209484 | 6/1992 |
| WO | 9502471 | 1/1995 |
| WO | 9627045 | 9/1996 |
| WO | 9719157 | 5/1997 |
| WO | 9720694 | 6/1997 |
| WO | 0012303 | 3/2000 |
| WO | 0119689 | 3/2001 |
| WO | 03070391 | 8/2003 |
| WO | 03078173 | 9/2003 |
| WO | 03087977 | 10/2003 |
| WO | 2005085381 | 9/2005 |

\* cited by examiner

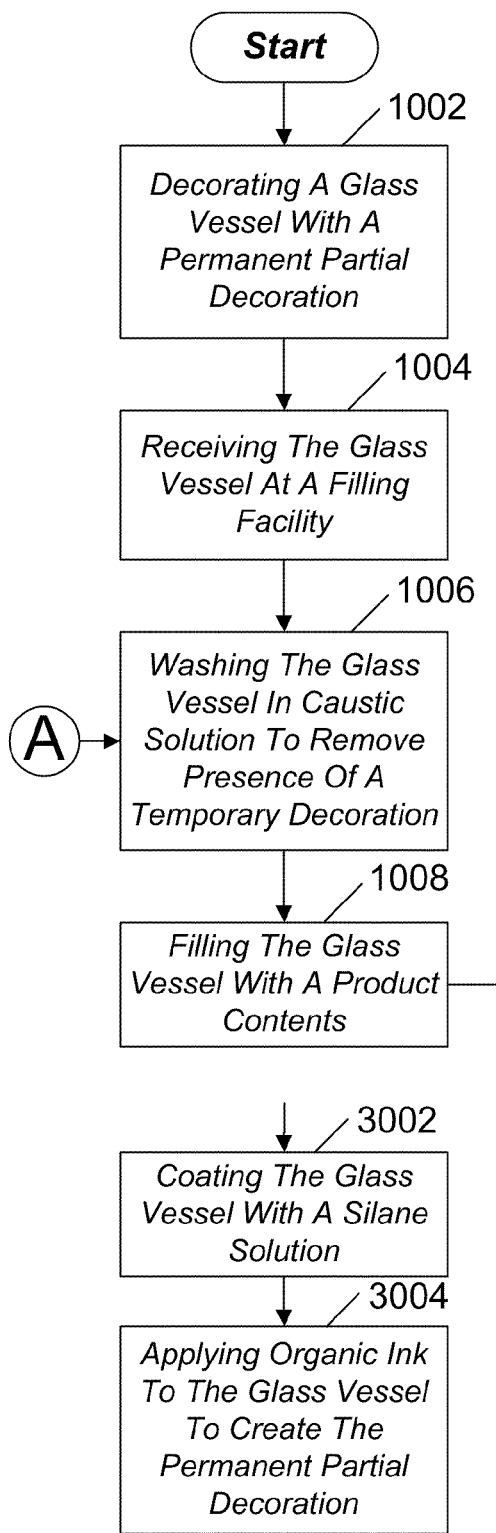
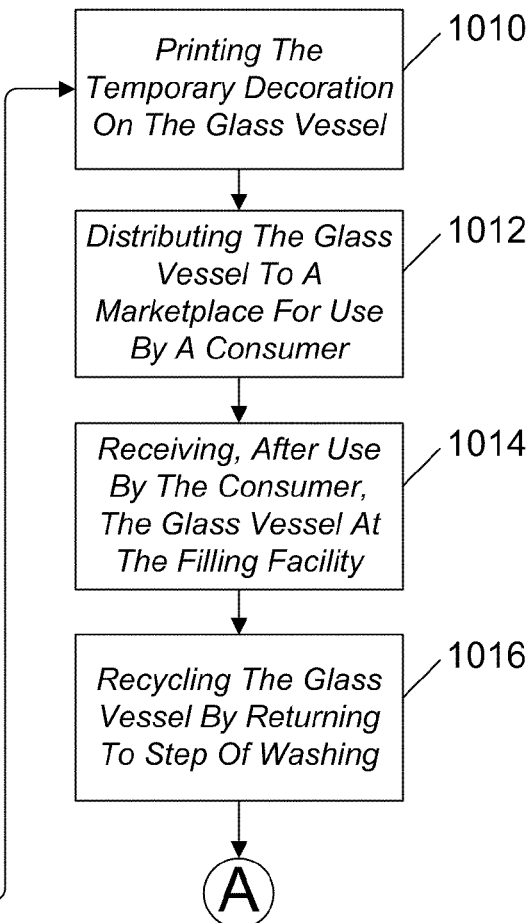
Fig. 3
Fig. 4A
Fig. 4B

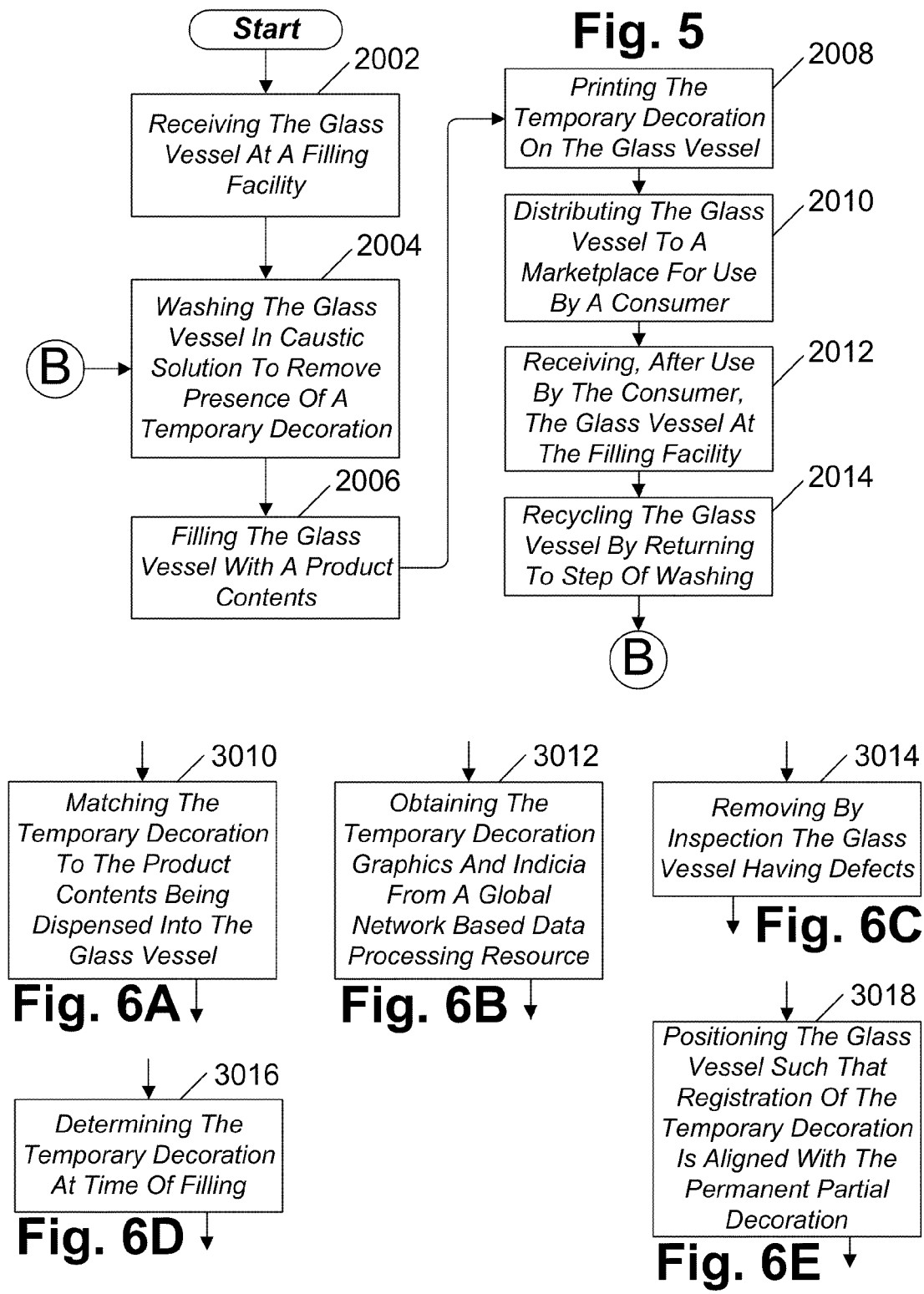

METHOD OF USING TEMPORARY DECORATION TO MASS CUSTOMIZE REFILLABLE GLASS VESSELS

FIELD OF THE INVENTION

This invention relates to a method of using a combination permanent partial decoration and temporary decoration to mass customize refillable glass vessels and particularly to a method comprising: decorating a glass vessel with a permanent partial decoration, receiving the glass vessel at a filling facility, washing the glass vessel in caustic solution to remove presence of a temporary decoration, filling the glass vessel with a product contents, printing the temporary decoration on the glass vessel, distributing the glass vessel to a marketplace for use by a consumer, receiving the consumer used glass vessel at the filling facility, and recycling the glass vessel by returning to the step of washing.

BACKGROUND OF THE INVENTION

Before our invention a bottler of beverage products that uses refillable glass bottles needed to maintain an inventory of bottles for each product that was to be bottled. In this regard, a bottler would have to maintain a supply of COKE labeled bottles, DIET COKE labeled bottles, COKE ZERO labeled bottles, and many other types and kinds of pre-printed paper labels for use of glass bottles or pre-labeled glass bottles for each brand and product type. This forced the bottler to carry an excessively large inventory of all types of glass bottles necessary to accommodate the varying brands and product types.

Another shortcoming of pre-labeled glass bottles is that it can be difficult to use refillable glass bottles for small brands and new product launches since a costly inventory of pre-labeled glass bottles is necessary to sustain the use of refillable glass bottles in the marketplace.

Another shortcoming of pre-labeled glass bottles is that once a permanent label is applied to the bottle it cannot be changed. This prevents the changing of graphics, limits the ability to run promotional graphics, and prevents the product contents information from being altered on the glass bottle. This can lead to the bottler needing to remove from circulation or otherwise destroy glass bottles because of labeling issues.

Yet another shortcoming of pre-labeled glass bottles is that product variety packs that contain different products in a single multi-package are difficult to fabricate in part due to the fact that pre-labeled bottles prevent different products from being dispensed into bottles on a production line without first insuring that the bottle is labeled correctly. Thus an entire production line must be setup for each individual product type. The different filled products must then be temporarily stored and then usually with manual intervention the product types are arranged for mixing and repackaging in multi-package forms. The need to insure the correct pre-labeled bottle get filled with the correct product in combination with the inability to change the labeling of the glass bottles can create extra steps and costs in the manufacture of multi-packaging.

The shortcomings mentioned above as well as other shortcomings give rise to the long felt need for the present invention.

BRIEF SUMMARY OF THE INVENTION

The shortcomings of the prior art are overcome and additional advantages are provided through the provision of a method of using combination permanent partial decoration and temporary decoration to mass customize refillable glass vessels, the method comprising: decorating a glass vessel with a permanent partial decoration, receiving the glass vessel at a filling facility, washing the glass vessel in caustic solution to remove presence of a temporary decoration, filling the glass vessel with a product contents, printing the temporary decoration on the glass vessel, distributing the glass vessel to a marketplace for use by a consumer, receiving, after use by the consumer, the glass vessel at the filling facility, and recycling the glass vessel by returning to step of washing.

Additional shortcomings of the prior art are overcome and additional advantages are provided through the provision of a method of using temporary decoration to mass customize refillable glass vessels, the method comprising: receiving the glass vessel at a filling facility, washing the glass vessel in caustic solution to remove presence of a temporary decoration, filling the glass vessel with a product contents, printing the temporary decoration on the glass vessel, distributing the glass vessel to a marketplace for use by a consumer, receiving, after use by the consumer, the glass vessel at the filling facility, and recycling the glass vessel by returning to step of washing.

Additional shortcomings of the prior art are overcome and additional advantages are provided through the provision of a method of using combination permanent partial decoration and temporary decoration to mass customize refillable glass vessels, the method comprising: decorating a glass vessel with a permanent partial decoration, the permanent partial decoration having a background region, washing the glass vessel in caustic solution to remove presence of a temporary decoration, printing the temporary decoration on the glass vessel, wherein at least some of the temporary decoration is printed on top of the background region to increase the luminance qualities of the temporary decoration, distributing the glass vessel to a marketplace for use by a consumer, and recycling the glass vessel used by the consumer, returning to step of washing.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 illustrates one example of a method of using a combination of permanent partial decoration and temporary decoration to mass customize refillable glass vessels;

FIG. 4A illustrates one example of a method of selectively coating the glass vessel with a silane solution and applying organic ink;

FIG. 4B illustrates one example of a method of creating a permanent partial decoration on the glass vessel by application of an applied ceramic label;

FIG. 5 illustrates one example of a method of using a temporary decoration to mass customize refillable glass vessels;

FIG. 6A-6E illustrates examples of preferred embodiments including matching temporary decoration with product contents, determining which temporary decoration to use, obtaining the temporary graphic over a global network, positioning the glass vessel for temporary decoration alignment, and removing defective glass vessels.

The detailed description explains the preferred embodiments of the invention, together with advantages and features, by way of example with reference to the drawings.

DETAILED DESCRIPTION OF THE INVENTION

Figure 1A:
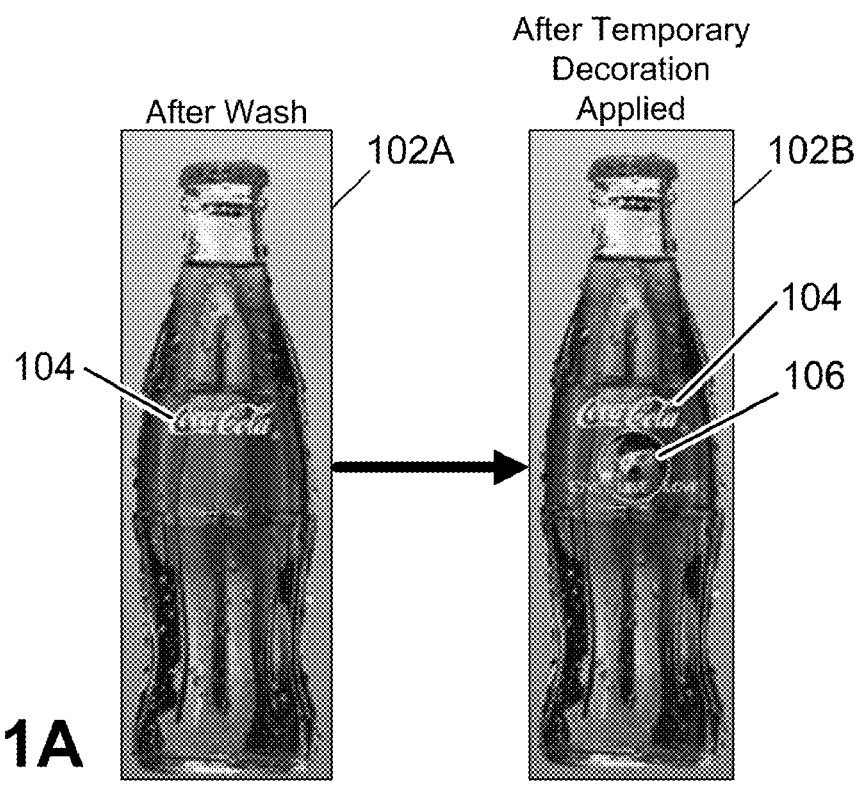
FIG. 1A illustrates one example of a glass vessel having a permanent partial decoration and added, at a filling facility, a temporary decoration.

Turning now to the drawings in greater detail, it will be seen that in FIG. 1A there is a glass vessel having a permanent partial decoration 104 and added, at a filling facility, a temporary decoration 106. Shown in FIG. 1A is a glass vessel 102A after a caustic washing showing the permanent partial decoration 104 that does not wash off in the caustic wash solution. Also shown is glass vessel 102B shown after the temporary decoration 106 has been applied. Illustrated as the temporary decoration 106 is the COCA-COLA polar bear. In a plurality of other embodiments the temporary decoration 106 can be a graphic, indicia, a product label, promotional in nature, informational, and or be applied to the glass vessel for other purposes, as may be required and or desired in a particular embodiment.

In an exemplary embodiment, after glass vessel manufacture a permanent partial decoration 104 can be applied to the glass vessel 102A. In this regard, permanent partial decoration techniques such as applied ceramic labeling (ACL), coating the glass vessel with silane and then applying an organic ink such as ECOBRITE, FERO SPECTRULITE, thermally cured inks, radiation cured inks, or other permanent partial decoration techniques, as may be required and or desired in a particular embodiment can be implemented. For purposes of disclosure glass vessel 102A-102B can be referred to as glass vessel 102. Methods for applying the temporary decoration 106 can include screen printing, ink jet printing, and or other methods of applying the temporary decoration 106, as may be required and or desired in a particular embodiment. Suitable glass vessels can include bottles, drinking glasses, jars, and or other types and kinds of suitable glass vessels, as may be required and or desired in a particular embodiment. Other printing methods can include decal, transfer, lithography, and or other types and kinds of printing methods as may be required and or desired in a particular embodiment. Such thermally curable inks can include as epoxy, polyurethane, or other type of thermally cured inks. Such radiation curable inks can include acrylics, commonly referred to as ultra violet (UV) curable inks, electron beam curable inks, microwave curable inks, or other radiation curable inks.

In an exemplary embodiment, the permanent partial decoration 104 remains on the glass vessel 102A after the caustic wash. Such caustic washings occur when a glass vessel is cleaned prior to filling the glass vessel 102A with a product contents. In an exemplary embodiment a caustic wash solution can be both acid and base solutions. In an exemplary embodiment, for example and not a limitation, such a caustic wash solution can be at a minimum 2.5% NaOH, 60° Celsius, for 5 minutes; Typical: 3.5% NaOH, 70° Celsius; 7 minutes; Range: 1.5-10% NaOH; 50-90 Celsius; Additives: Solutions generally contain additives to improve washing, protect the glass or chelate foreign contaminants. Examples include, but are not limited to anti-etch additives such as DIVOBRITE LE, STABILION GL, and EDTA based chelating.

In a preferred embodiment after the glass vessel 102A is washed in a caustic wash removing any previous temporary decoration a new temporary decoration 106 can be applied to the glass vessel 102B. The glass vessel 102B now having the permanent partial decoration 104 and the temporary decoration 106 is filled and ready for distribution to a consumer.

Figure 1B:
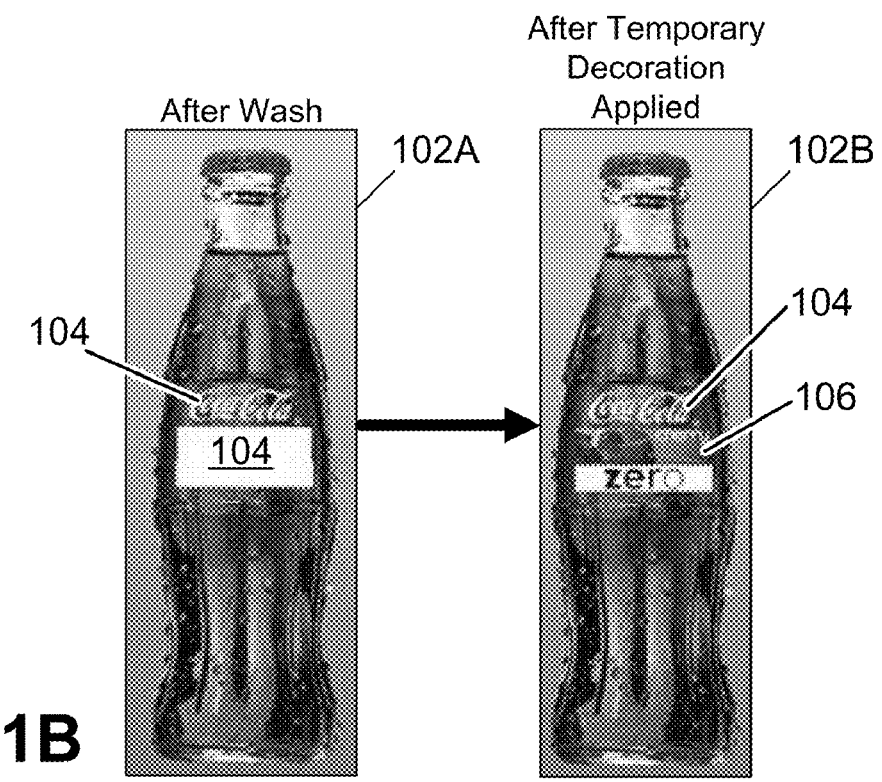
FIG. 1B illustrates one example of a glass vessel having a permanent partial decoration including a white background and added, at a filling facility, a temporary decoration.

Referring to FIG. 1B there is illustrated one example of a glass vessel having a permanent partial decoration 104 including a white background and added, at a filling facility, a temporary decoration 106. Shown in FIG. 1B is a glass vessel 102A after a caustic washing showing the permanent partial decoration 104 that does not wash off in the caustic wash solution. Also illustrated is glass vessel 102B shown after the temporary decoration 106 has been applied. Illustrated as temporary decoration 106 is the COCA-COLA CHERRY ZERO product label printed on top of a portion of the permanent partial decoration 104. In a plurality of other embodiments the temporary decoration 106 can be a graphic, indicia, a product label, promotional in nature, informational, and or be applied to the glass vessel for other purposes, as may be required and or desired in a particular embodiment.

An advantage of the present invention is that a permanent partial decoration 104 can include a white, red, or other color background. In this regard, a solid white, red, or other color background provides a low cost permanent way to decorate a large surface area on the glass vessel surface. This has several advantages detail below when applying a future temporary decoration 106.

One such advantage is that the printing of the temporary decoration onto a white background gives the temporary decoration better luminance qualities. In application, printing full color graphics on a translucent surface like a glass vessel can cause the graphics to look washed out or present dull or low luminance qualities. To improve the graphics luminance qualities the graphics, the present invention can print the temporary graphics on a white background that was applied as part of the permanent partial decoration.

Another such advantage is to reduce the amount of temporary decoration ink used by covering a large surface area that always remains the same color with the permanent partial decoration. In an exemplary embodiment, COKE red can be applied as part of a permanent partial decoration and temporary decorations can be applied on top of the red background to save red temporary decoration ink.

Another such advantage is the temporary decoration print speed can be increased and curing time decreased when large surface areas are created as part of the permanent partial decoration rather than using more ink in the application of the temporary decoration. In an exemplary embodiment curing can be effectuated by way of ultraviolet light, heat, electron beam, microwave, steam, forced air, and or by way of other curing techniques, as may be required and or desired in a particular embodiment.

Referring back to FIG. 1B there is illustrated a glass vessel 102A having a permanent partial decoration 104 that includes a white background rectangle region. At a filling facility the temporary decoration 106 is applied to the glass vessel 102B. As such the application of a full color temporary decoration 106 is applied on top of the permanent decoration 104. In the present invention, this has the effect of increasing the luminance qualities of the temporary decoration 106.

Figure 1C:
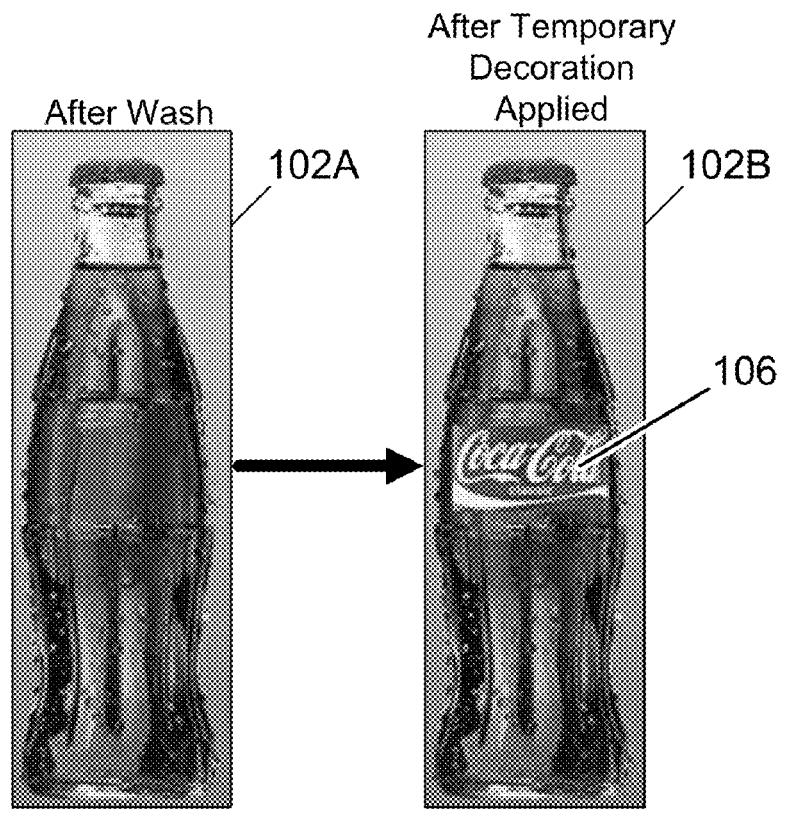
FIG. 1C illustrates one example of a glass vessel having no decoration and added, at a filling facility, is a temporary decoration.

Referring to FIG. 1C there is illustrated one example of a glass vessel having no decoration and added, at a filling facility, is a temporary decoration. Shown in FIG. 1C is a glass vessel 102A after a caustic washing having no decoration on the glass vessel. Also illustrated is glass vessel 102B shown after the temporary decoration 106 has been applied. Illustrated as temporary decoration 106 is the COCA-COLA product label. In a plurality of other embodiments the temporary decoration 106 can be a graphic, indicia, a product label, promotional in nature, informational, and or be applied to the glass vessel for other purposes, as may be required and or desired in a particular embodiment.

In an exemplary embodiment, the glass vessel 102A can be decoration free after wash in a caustic solution. In an exemplary embodiment, for example and not a limitation, such a caustic wash solution can be at a minimum 2.5% NaOH, 60° Celsius, for 5 minutes; Typical: 3.5% NaOH, 70° Celsius; 7 minutes; Range: 1.5-10% NaOH; 50-90 Celsius; Additives: Solutions generally contain additives to improve washing, protect the glass or chelate foreign contaminants. Examples include, but are not limited to anti-etch additives such as DIVOBRITE LE, STABILION GL, and EDTA based chelating. The glass vessel 102B then has a temporary decoration 106 applied to the glass vessel 102 prior to distribution to a consumer.

Figure 2:
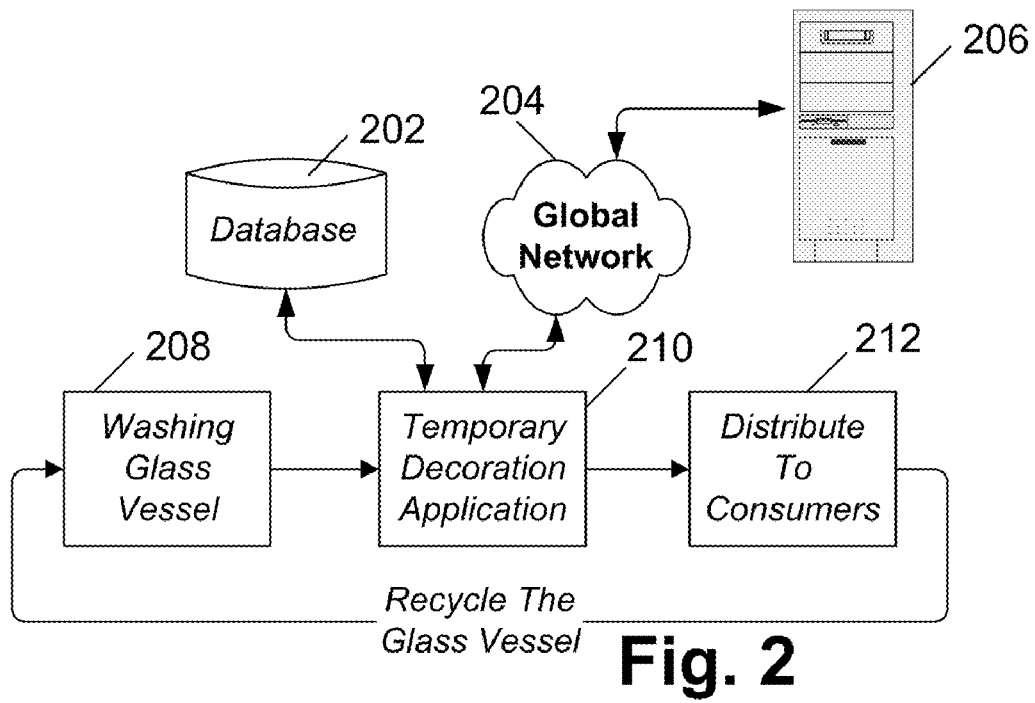
FIG. 2 illustrates one example of a system for applying a temporary decoration to refillable glass vessels and obtaining the temporary decoration from a database or over a global network.

Referring to FIG. 2 there is illustrated a system for a applying temporary decoration to refillable glass vessels and obtaining the temporary decoration from a database or over a global network. In an exemplary embodiment, an on-demand printing system can be implemented to effectuate the ability to query and change the temporary decoration. In this regard, temporary decorations can be manually loaded, retrieved from an accessible library, queried from a database 202, obtained over a global network 204 from a global network based data processing resource 206, or changed by way of other ways, as may be required and or desired in a particular embodiment.

Referring back to FIG. 2, in an exemplary embodiment the glass vessels 102 can be washed 208 in a caustic solution removing any temporary decorations. Temporary decorations can be applied 210 to the glass vessel. The temporary decoration can be manually loaded, retrieved from a library, queried from a database 202, obtained over a global network 204 from a global network based data processing resource 206, or changed by way of other ways, as may be required and or desired in a particular embodiment. The glass vessel can be distributed 212 to consumers. After use by the consumer the glass vessel 102 can be recycled and the glass vessel can be reused beginning again with washing 208.

Referring to FIG. 3 there is illustrated one example of a method of using a combination of permanent partial decoration and temporary decoration to mass customize refillable glass vessels. In an exemplary embodiment, a glass vessel 102 can have an initial permanent partial decoration added before the glass vessel enters the filling facility for the first time. The permanent partial decoration does not wash off during the recycle wash in a caustic solution. A temporary decoration that is washed off with a caustic solution can be added after the wash step. Washing the temporary decoration off and reapplying at the filling facility each time the glass vessel is filled with product contents effectuates the ability to mass customize the temporary decoration. This mass customization allows the same glass vessel to be refilled with different product contents and decorated differently each time the glass vessel is recycled. This is an advantage to the owner of the glass vessels in that they can carry a smaller inventory or float of glass vessels, as a single vessel can be reusable for bottling multiple product contents over the life of the glass vessel. Prior to the present invention the owner of the glass vessel would have to carry a separate supply for each product contents bottled just because the decoration including the labeling of the product contents was permanent, not washable, and could not be changed. The method begins in block 1002.

In block 1002 the glass vessel is initially decorated with a permanent partial decoration. In this regard, permanent decoration techniques such as applied ceramic labeling (ACL), coating the glass vessel with silane and then applying an organic ink such as ECOBRITE, or other permanent decoration techniques, as may be required and or desired in a particular embodiment can be implemented. The method continues in block 1004.

In block 1004 the glass vessels having the permanent partial decoration applied are received at a filling facility. A filling facility can be a beverage bottler or other filling facility, as may be required and or desired in a particular embodiment. The method continues in block 1006.

In block 1006 the glass vessel is washed in a caustic solution cleaning, sterilizing, and removing any temporary decoration from the glass vessel. The method continues in block 1008.

In block 1008 the glass vessel if filled with a product contents. Such a product contents can be a beverage, food, or other product contents, as may be required and or desired in a particular embodiment. The method continues in block 1010.

In block 1010 the temporary decoration is applied to the glass vessel. Such application can be aligned with the permanent partial decoration to create a graphically pleasing, consumer presentable, finished decorated glass vessel. In addition, the temporary decoration can be applied over some or all of the permanent partial decoration and or permanent partial decoration background. The method continues in block 1012.

In block 1012 the glass vessel with the combination permanent partial decoration and the temporary decoration can be distributed to the marketplace for use by a consumer. The method continues in block 1014.

In block 1014 after the consumer uses the glass vessel the glass vessel is returned through recycling channels to the filling facility. The filling facility receives the glass vessel. The method continues in block 1016.

In block 1016 the glass vessel is recycled by returning the glass vessel to the step of washing in block 1006, wherein the temporary decoration is washed from the glass vessel and the glass vessel is prepared for refilling of a product contents and reapplication of a new temporary decoration.

Referring to FIGS. 4A and 4B are embodiments that can be selectively utilized with the methods of the present invention. Referring to FIG. 4A there is illustrated one example of a method of selectively coating the glass vessel with a silane solution and applying organic ink. In an exemplary embodiment, to increase the bond strength of the organic ink to the glass vessel surface, to create a permanent partial decoration, the glass vessel can be coated with a silane coating prior to applying the organic ink. An embodiment that can be selectively utilized with the methods of the present invention begins in block 3002.

In block 3002 the glass vessel is coating with a silane solution. Such a silane solution can be Aminopropyltriethoxysilane H2NC3H6—Si(OC2H5)3 distributed under the trade names MOMENTIVE SILQUESTt A-1100 and DOW CORNING Z-6011. The method continues in block 3004.

In block 3004 the organic ink is applied to the silane coated glass vessel to create a permanent partial decoration. The method is then exited.

Referring to FIG. 4B there is illustrated one example of a method of creating a permanent partial decoration on the glass vessel by application of an applied ceramic label. In an exemplary embodiment, an applied ceramic label can be applied to the glass vessel to create a permanent partial decoration. An embodiment that can be selectively utilized with the methods of the present invention begins in block 3006.

In block 3006 an applied ceramic label (ACL) is applied to the glass vessel to create a permanent partial decoration. The method continues in block 3008.

In block 3008 the glass vessel with ACL applied is heated to permanently set the ACL decoration on the glass vessel surface. The method is then exited.

Referring to FIG. 5 there is illustrated one example of a method of using a temporary decoration to mass customize refillable glass vessels. In an exemplary embodiment, the temporary decoration can be the only decoration on the glass vessel surface. In this embodiment, no permanent partial decoration is present on the glass vessel surface. As such, during the washing in a caustic solution all the decoration is removed from the glass vessel and during filling with a product contents a new temporary decoration is applied to the glass vessel. The method begins in block 2002.

In block 2002 the glass vessel has no decoration (if a new glass vessel) or only glass vessels with a temporary decoration are received at a filling facility. The method continues in block 2004.

In block 2004 the glass vessel is washed in a caustic solution cleaning, sterilizing, and removing any temporary decoration from the glass vessel. The method continues in block 2006.

In block 2006 the glass vessel if filled with a product contents. Such a product contents can be a beverage, food, or other product contents, as may be required and or desired in a particular embodiment. The method continues in block 2008.

In block 2008 the temporary decoration is applied to the glass vessel. The method continues in block 2010.

In block 2010 the glass vessel with the temporary decoration can be distributed to the marketplace for use by a consumer. The method continues in block 2012.

In block 2012 after the consumer uses the glass vessel the glass vessel is returned through recycling market channels to the filling facility. The filling facility receives the glass vessel. The method continues in block 2014.

In block 2014 the glass vessel is recycled by returning the glass vessel to the step of washing in block 2004, wherein the temporary decoration is washed from the glass vessel and the glass vessel is prepared for refilling of a product contents and reapplication of a new temporary decoration.

Referring to FIGS. 6A-6E there are illustrated examples of preferred embodiments including matching temporary decoration with product contents, determining which temporary decoration to use, obtaining the temporary graphic over a global network, positioning the glass vessel for temporary decoration alignment, and removing defective glass vessels.

Referring to FIG. 6A an embodiment that can be selectively utilized with the methods of the present invention begins in block 3010. In block 3010 the temporary decoration can be matched to the product contents being dispensed into the glass vessel. In this regard, for example and not a limitation, as the product contents change a bottler does not need to change the glass vessels so that the decoration including the product labeling matches the product contents. Rather, the on-demand printing system can be loaded with a different temporary decoration and the glass vessel can be mass customized to match the temporary decoration with product contents in the filled glass vessel.

Referring to FIG. 6B an embodiment that can be selectively utilized with the methods of the present invention begins in block 3012. In block 3012 temporary decoration graphic and indicia content can be obtained from a global network based data processing resource. Such a global network based data processing resource can be a personal computer, server, or other data processing resource. A global network can be the Internet.

Referring to FIG. 6C an embodiment that can be selectively utilized with the methods of the present invention begins in block 3014. In block 3014 an inspection system for defect detection can be effectuated to inspect the glass vessel itself, the permanent partial decoration, the temporary decoration, and or inspect for other defects. Upon detecting a defect the glass vessel can be removed and prevented from distribution to a consumer.

Referring to FIG. 6D an embodiment that can be selectively utilized with the methods of the present invention begins in block 3016. In block 3016 a determination can be made at the time of filling which temporary decoration should be utilized. Upon determination the temporary decoration content graphics and indicia can be obtained from a library, a database, data processing resource, or other by way of other method, as may be required and or desired in a particular embodiment.

Referring to FIG. 6E an embodiment that can be selectively utilized with the methods of the present invention begins in block 3018. In block 3018 the glass vessel can be positioned or otherwise aligned such that the registration of the temporary decoration is aligned with the permanent partial decoration. The advantage is that with alignment between the permanent partial decoration and the temporary decoration a more visually and consumer appealing glass vessel with decoration is produced.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A method of using combination permanent partial decoration and temporary decoration to mass customize refillable glass vessels, the method comprising:
   decorating a glass vessel with a permanent partial decoration;
   receiving the glass vessel at a filling facility;
   washing the glass vessel in caustic solution to remove presence of a temporary decoration;
   filling the glass vessel with a product contents;
   printing the temporary decoration on the glass vessel;
   distributing the glass vessel to a marketplace for use by a consumer;
   receiving, after use by the consumer, the glass vessel at the filling facility; and
   recycling the glass vessel by returning to step of washing.

2. The method in accordance with claim 1, further comprising:
   creating the permanent partial decoration on the glass vessel by application of an applied ceramic label; and
   heating the glass vessel to set the permanent partial decoration.

3. The method in accordance with claim 1, further comprising:
   coating the glass vessel with a silane solution; and
   applying organic ink to the glass vessel to create the permanent partial decoration.

4. The method in accordance with claim 1, further comprising:
   removing by inspection the glass vessel having defect associated with the glass vessel, the permanent partial decoration, or the temporary decoration.

5. The method in accordance with claim 1, further comprising:
   positioning the glass vessel such that registration of the temporary decoration is aligned with the permanent partial decoration.

6. The method in accordance with claim 1, wherein at least a portion of the permanent partial decoration is a white background and at least some of the temporary decoration is printed on the white background, wherein the white background enhances luminance qualities of the temporary decoration printed on top of the white background.

7. The method in accordance with claim 1, further comprising:
   determining the temporary decoration graphics and indicia at time of filling the glass vessel.

8. The method in accordance with claim 1, further comprising:
   obtaining the temporary decoration graphics and indicia from a global network based data processing resource.

9. A method of using combination permanent partial decoration and temporary decoration to mass customize refillable glass vessels, the method comprising:
   decorating a glass vessel with a permanent partial decoration, the permanent partial decoration having a background region; washing the glass vessel in caustic solution to remove presence of a temporary decoration;
   printing the temporary decoration on the glass vessel, wherein at least some of the temporary decoration is printed on top of the background region to increase the luminance qualities of the temporary decoration;
   distributing the glass vessel to a marketplace for use by a consumer; and
   recycling the glass vessel used by the consumer, returning to step of washing.

10. The method in accordance with claim 9, wherein at least a portion of the permanent partial decoration is a white background and at least some of the temporary decoration is printed on the white background, wherein the white background enhances luminance qualities of the temporary decoration printed on top of the white background.

11. The method in accordance with claim 9, further comprising:
    matching the temporary decoration to the product contents being dispensed into the glass vessel, the product contents can vary for each of the glass vessel being filled, wherein each of the temporary decoration on each of the glass vessel is matched to the product contents in the glass vessel such that mixed product packages can be formed.

* * * * *